Patented Aug. 31, 1937

2,091,417

UNITED STATES PATENT OFFICE 2,091,417

SULPHUR DYESTUFF PREPARATIONS

Paul Schick and Christoph Kohl, Frankfort-on-the-Main-Fechenheim, Germany, assignors to General Aniline Works, Inc., New York, N. Y., a corporation of Delaware No Drawing. Application January 5, 1934, Serial No. 705,463. In Germany January 23, 1933

3 Claims. (Cl. 8—6)

Our present invention relates to new sulphur dyestuff preparations and to a process of making same.

The sulphur dyestuff preparations hitherto described and known in the art generally contain the dyestuff in the reduced state, i. e. they are made by drying a mixture of the wet reduced dyestuff and of the reducing agent (sodium sulphide, sodium sulphhydrate or both in an amount necessary for dyeing purposes). By this process, however, products of varying shade and strength are obtained in consequence of the sensitivity of the sulphur dyestuffs to strong alkalies. Therefore an exact standardization of such preparations as to shade and strength is very difficult.

Another known method of making sulphur dyestuff preparations is by mixing the dry dyestuff with concentrated sodium sulphide. These preparations can be used for dyeings simply by dissolving them in water, but they show an insufficient stability in consequence of the oxidation of the admixed sodium sulphide by means of the air.

Our present invention is based on the observation that a certain hygroscopicity is necessary for useful and stable sulphur dyestuff preparations and it relates to new compositions of matter which are powdery mixtures of a sulphur dyestuff, an alkali sulphide (and advantageously an alkali hydrosulphide) and at least one of the group of hygroscopic agents consisting of alkali metal salts of feeble organic acids (e. g. sodium formate, potassium thiocyanate), and the alkali metal salts of sulphurized derivatives of aromatic hydroxy compounds, or mixtures thereof.

The preparations which are the object of this invention may be obtained by mixing the components in a customary mixing device. As a special process of making them, the ingredients to be added to the dyestuff may be per se either mixed in a wet state or dissolved and this mixture may be dried in any known way. In this manner products of a high reducing value and a good stability may be obtained which yield when mixed with sulphur dyestuffs useful dyestuff preparations.

Our new dyestuff preparations are very stable. They yield by simply dissolving them in water dye-baths ready for use and may also be employed for printing purposes. They can be easily standardized as to strength and shade like the customary commercial sulphur dyestuffs.

These useful properties are obtained presumably because the preparations are produced in the absence of water (whereby any alteration of strength or shade of the dyestuff is avoided since the reaction between the components is impossible) and because the preparations form when exposed to the air, for instance in open packages a cohering surface with the aid of the moisture of air (whereby the surface is diminished and the mass is protected from the oxidizing action of the air).

In order to further illustrate our invention the following examples are given; but we wish it, however, to be understood that our invention is not limited to the particular products or reacting conditions stated therein.

Example 1

| | Parts |
|---|---|
| Immedialindon R (Schultz, Farbstofftabellen, 7th edition No. 1100) | 10 |
| Sodium sulphydrate | 11 |
| Sodium sulphide | 5 |
| Sodium salt of the sulphurized product or phenol | 2,5 |
| Glycerol | 1 | are mixed together.

Instead of the sodium salt of the sulphurized product of phenol, an alkali metal salt of another sulphurized phenol, for instance of a sulphurized cresol, may be used.

Example 2

| | Parts |
|---|---|
| Immedialindoneviolet B (Colour Index 1924, p. 355) | 10 |
| Sodium sulphydrate | 18 |
| Sodium sulphide | 8 |
| Sodium salt of the sulphurized product of phenol | 4 |
| Sodium formate | 2 | are mixed together.

A preparation of similar properties is obtained also without the use of formate.

Example 3

| | Parts |
|---|---|
| Thiogenneublau 3GL (Schultz, Farbstofftabellen, Vol. II, p. 207) | 10 |
| Sodium sulphydrate | 11 |
| Sodium sulphide | 5 |
| Sodium formate | 3,5 | are mixed together.

Example 4

| | Parts |
|---|---|
| Thiogenneublau 3GL (Schultz, Farbstofftabellen, Vol. II, p. 207) | 10 |
| Sodium sulphydrate | 12 |
| Sodium sulphide | 4 |
| Potassium thiocyanate | 4 | are mixed together.

Example 5

| | Parts |
|---|---|
| Sodium sulphydrate | 16 |
| Sodium sulphide | 9 |
| Sodium salt of the sulphurized product of phenol | 3 |
| Urea | 1,5 | are mixed in a wet state and the mixture is dried. To this dry mixture 10 parts of Katigen Brillantgrün 3G (Schultz, Farbstofftabellen, Vol. II, p. 136) are added.

We claim:

1. A sulphur dyestuff preparation consisting of a sulphur dyestuff, an alkali sulphide, an alkali hydrosulphide, and an alkali metal salt of a sulphurized derivative of a nuclear-hydroxy-substituted aromatic compound, which preparations are stable powders yielding dye-baths ready for use by simply dissolving them in water.

2. A sulphur dyestuff preparation consisting of a sulphur dyestuff, an alkali sulphide, an alkali hydrosulphide and an alkali metal salt of a sulphurized derivative of phenol, which preparations are stable powders yielding dye-baths ready for use by simply dissolving them in water.

3. A sulphur dyestuff preparation consisting of a sulphur dyestuff, an alkali sulphide and an alkali metal salt of a sulphurized derivative of phenol, which preparations are stable powders yielding dye-baths ready for use by simply dissolving them in water.

PAUL SCHICK.
CHRISTOPH KOHL.